(12) United States Patent  (10) Patent No.: US 7,054,976 B2
Park                       (45) Date of Patent:    May 30, 2006

(54) COMPUTER SYSTEM HAVING IMPROVED INTERFACE

(75) Inventor: Kyun-Hoe Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 601 days.

(21) Appl. No.: 09/945,655

(22) Filed: Sep. 5, 2001

(65) Prior Publication Data

US 2002/0108008 A1   Aug. 8, 2002

(30) Foreign Application Priority Data

Dec. 13, 2000   (KR) .............................. 2000-76249

(51) Int. Cl.
G06F 13/00       (2006.01)
H05K 7/10        (2006.01)

(52) U.S. Cl. ....................................... 710/301; 710/300

(58) Field of Classification Search ........ 710/300–304, 710/8, 104
See application file for complete search history.

(56) References Cited

U.S. PATENT DOCUMENTS

| | | | | |
|---|---|---|---|---|
| 5,931,701 A * | 8/1999 | Pan et al. | .................... | 439/637 |
| 6,137,678 A * | 10/2000 | Gebara et al. | .............. | 361/685 |
| 6,219,732 B1 * | 4/2001 | Henrie et al. | ................ | 710/301 |
| 6,256,196 B1 * | 7/2001 | Lima | ........................... | 361/687 |
| 6,261,104 B1 * | 7/2001 | Leman | ........................ | 439/61 |
| 6,401,152 B1 * | 6/2002 | Solomon et al. | ............ | 710/104 |
| 6,438,638 B1 * | 8/2002 | Jones et al. | ................. | 710/301 |
| 6,592,031 B1 * | 7/2003 | Klatt | .......................... | 235/382 |

OTHER PUBLICATIONS

"Communication and Network Riser Specification", Revision 1.1, Intel Corporation, Oct. 18, 2000.*

* cited by examiner

*Primary Examiner*—Tim Vo
*Assistant Examiner*—Trisha Vu
(74) *Attorney, Agent, or Firm*—Robert E. Bushnell, Esq.

(57) ABSTRACT

A computer system includes a computer body and a main board installed in the computer body, the main board having a digital controller configured to support an audio standard interface. The computer system further includes a card unit separated from the computer body, the card unit including a card for conducting at least one of audio and communication functions supporting the audio standard interface, a connection jack electrically connected to the card and adapted to transmit a signal from the card to the digital controller, and a connection port provided on the main board, the connection port being connectable to the connection jack so as to transmit the signal from the connection jack to the digital controller. By this configuration, the computer system can have and retain compatibility with different cards supporting the audio standard interface when one of those cards mounted on the main board is replaced by another one of the cards without any replacement of the main board.

23 Claims, 5 Drawing Sheets

COMPUTER SYSTEM HAVING IMPROVED INTERFACE

CLAIM OF PRIORITY

This application makes reference to, incorporates the same herein, and claims all benefits accruing under 35 U.S.C. §119 from my application COMPUTER SYSTEM filed with the Korean Industrial Property Office on Dec. 13, 2000 and there duly assigned Serial No. 76249/2000.

BACKGROUND OF THE INVENTION

1. Technical Field

The present invention relates to a computer system, and more particularly to an improved interface for a computer system.

2. Related Art

The Audio-Codec '97 (AC97) standard is an audio standard for personal computers (PCs) established by a consortium constructed by PC-associated semiconductor manufacturing companies, for examples, Intel Corporation, Analog Device Corporation, Yamaha Corporation, and NS Corporation, etc. This AC97 is a standard for separating analog and digital circuits from each other in order to obtain an improved performance of audio functions. In detail, the AC97 defines the interface between a digital controller (AC97 digital link) connected to the bus of a computer and an analog codec (AC97 analog codec) serving to process analog inputs/outputs. The term codec is short for compressor/decompressor.

The digital controller (hereinafter referred to as an AC97 controller), which is mounted to a main board, may comprise an input/output (I/O) control hub (ICH) chip or ICH2 chip by Intel Corporation, or a south bridge chip by VIA Corporation. The analog codec is mounted to an optional card such as a sound card or a communication card.

Since the chip supporting the AC97 standard interface is internally provided at the main board, the associated computer system can inexpensively achieve both the audio and communication functions only by use of an external analog codec.

An audio modem riser (AMR) card slot is provided at the main board in accordance with the AC97 standard. In addition to the audio modem riser card, a communication and networking riser (CNR) card and an advanced communication riser (ACR) card are known as cards supporting the AC97 standard interface. These communication and networking riser and advanced communication riser cards additionally have a networking function along with the audio and modem functions supported by existing audio modem riser cards. The communication and networking riser and advanced communication riser cards are provided with an analog codec having an audio function and a communication function. This analog codec performs an audio function and a communication (modem or networking) function respectively required in the associated system, in cooperation with an AC97 controller provided at the main board of the system.

Signals respectively transmitted from the above mentioned audio modem riser, communication and networking riser, and advanced communication riser cards to the AC97 controller of the main board are identical because those cards support the same interface, that is, the AC97 standard interface.

However, these three riser cards, all of which support the AC97 standard interface, have different pin arrangements and different pin numbers for the same signal. As a result, the three riser cards have different card shapes.

For this reason, the audio modem riser, communication and networking riser and advanced communication riser cards may be incompatible with one another despite the fact that they use the same analog codecs having the audio and communication functions. For example, communication and networking riser and advanced communication riser cards cannot be used in a main board provided with an audio modem riser card slot, as shown in the following Table 1. Similarly, audio modem riser and advanced communication riser cards cannot be used in a main board provided with a communication and networking riser card slot. Also, the communication and networking riser card cannot be used in a main board provided with an advanced communication riser card slot.

TABLE 1

|  | AMR Slot | CNR Slot | ACR Slot |
| --- | --- | --- | --- |
| AMR Card | Usable | X | Usable |
| CNR Card | X | Usable | X |
| ACR Card | X | X | Usable |

I have found that it is inconvenient to use a computer system with a main board which is not compatible with different AC97 cards.

SUMMARY OF THE INVENTION

Therefore, an object of the invention is to provide a computer system with an improved interface, so that the computer system is compatible with different AC97 cards, so that when one of those AC97 cards mounted to a main board supporting an AC97 standard interface is replaced by another one of the AC97 cards, the main board does not need to be replaced.

In accordance with the present invention, this object is accomplished by providing a computer system comprising a computer body, and a main board mounted in the computer body, the main board including a digital controller configured to support an audio standard interface, further comprising: a card unit separated from the computer body, the card unit including a card for performing at least one of audio and communication functions supporting the audio standard interface, and a connection jack electrically connected to the card and adapted to transmit a signal from the card to the digital controller; and connection means provided at the main board, the connection means being connectable with the card unit to transmit the signal from the connection jack to the digital controller.

Preferably, the card unit further includes a housing for receiving the card. The connection means may comprise a serial port, a parallel port, or an audio standard interface port of a new type. Preferably, the card is one selected from among an audio modem riser card, a communication and networking riser card, and an advanced communication riser card.

Preferably, the computer system further comprises a connection cable connected between the connection means and the card unit to electrically connect the connection means and the card unit to each other. By this configuration, it is possible to easily connect the card unit to the connection means.

Preferably, the main board further includes a card slot adapted to directly mount the card thereto. In this case, the card unit may be dispensed with.

To achieve these and other objects in accordance with the principles of the present invention, as embodied and broadly described, the present invention provides a computer apparatus, comprising: a computer body; a main board mounted in said computer body; a digital controller mounted on said main board, said controller being configured to support an audio standard interface; a card unit not mounted in said computer body, said card unit including a card for performing at least one selected from among audio and communication functions, said functions supporting the audio standard interface; a connection jack electrically connected to the card and adapted to transmit a signal from the card to said digital controller; and a connection unit provided at said main board, said connection unit being connectable with said card unit to transmit the signal from said connection jack to said digital controller.

To achieve these and other objects in accordance with the principles of the present invention, as embodied and broadly described, the present invention provides a computer apparatus, comprising: a computer body; a main board mounted at an interior of said computer body; a first connection unit electrically connected to said main board; a digital controller mounted on said main board, said controller being configured to support a predetermined standard; and a connection jack having a first connection side and a second connection side, said first connection side being electrically connected to one card selected from among a plurality of cards, said second connection side being removably electrically connected to said first connection unit, said connection jack being adapted to transmit a signal from the selected card through said first connection unit to said digital controller, each one card among said plurality of cards performing functions in accordance with the predetermined standard.

To achieve these and other objects in accordance with the principles of the present invention, as embodied and broadly described, the present invention provides a method, comprising: mounting a main board at an interior of a computer body; connecting a first connection unit to said main board; mounting a digital controller on said main board, said controller being configured to support a predetermined standard; and removably connecting a connection jack to said first connection unit; selecting a first card performing functions in accordance with the predetermined standard; and connecting the selected card to said connection jack, said connection jack being adapted to transmit a signal from the selected card through said first connection unit to said digital controller.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF THE PREFERRED EMBODIMENTS

While the present invention will be described more fully hereinafter with reference to the accompanying drawings, in which preferred embodiments of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions or constructions are not described in detail since they would obscure the invention in unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 5:
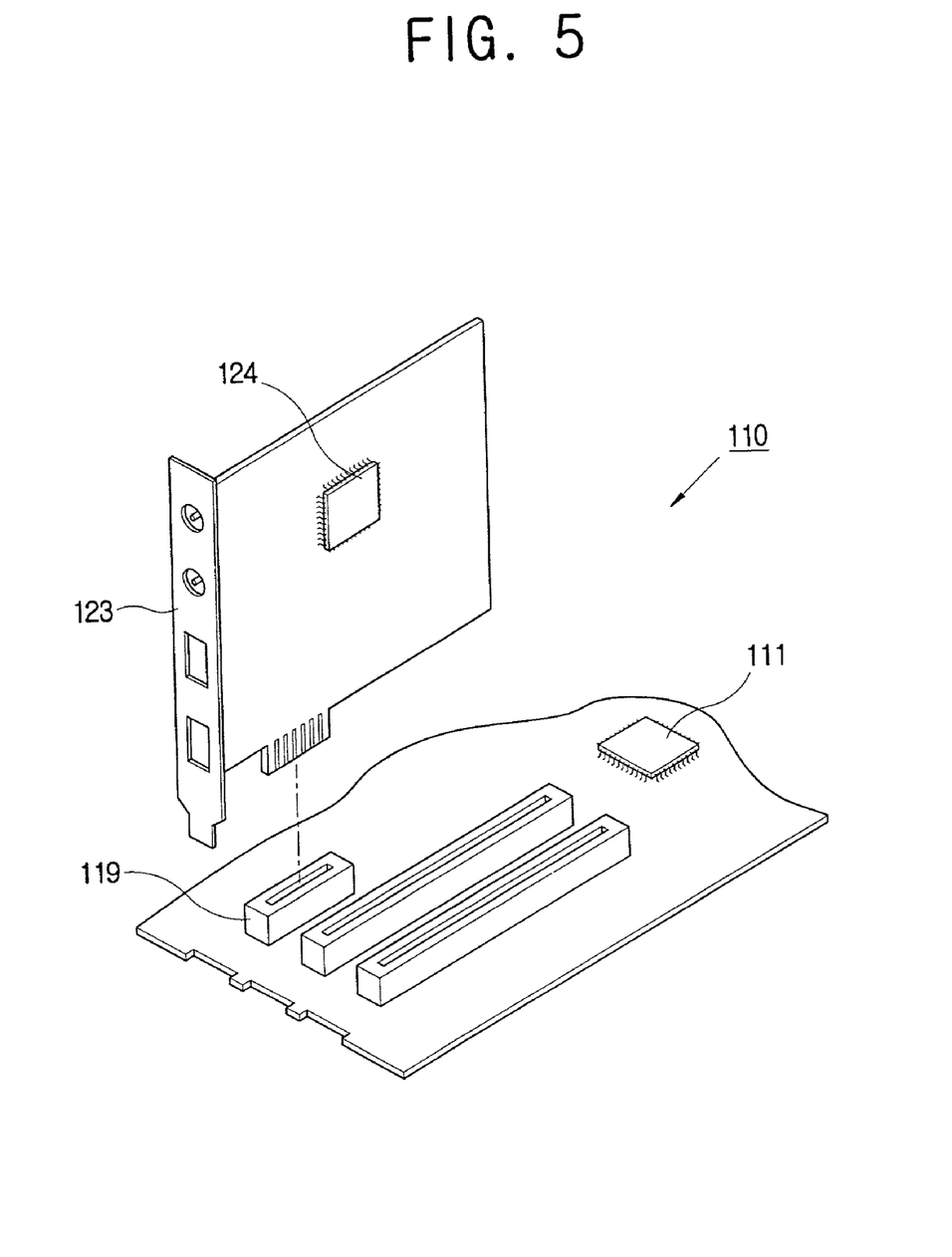
FIG. 5 is a perspective view illustrating a main board mounted with an AC97 card.

FIG. 5 is a perspective view illustrating the main board of a computer system. As shown in FIG. 5, the computer system includes a main board 110 mounted with an AC97 controller 111, and an audio modem riser (AMR) card 123 mounted with an analog codec 124 17 and connected in an AMR card slot 119 provided at the main board 110. Since the main board 110 supports the AC97 standard interface, the computer system can perform both the audio and modem functions, only by use of the AMR card 123 mounted with the analog codec 124 having both the audio and modem functions.

Figure 1:
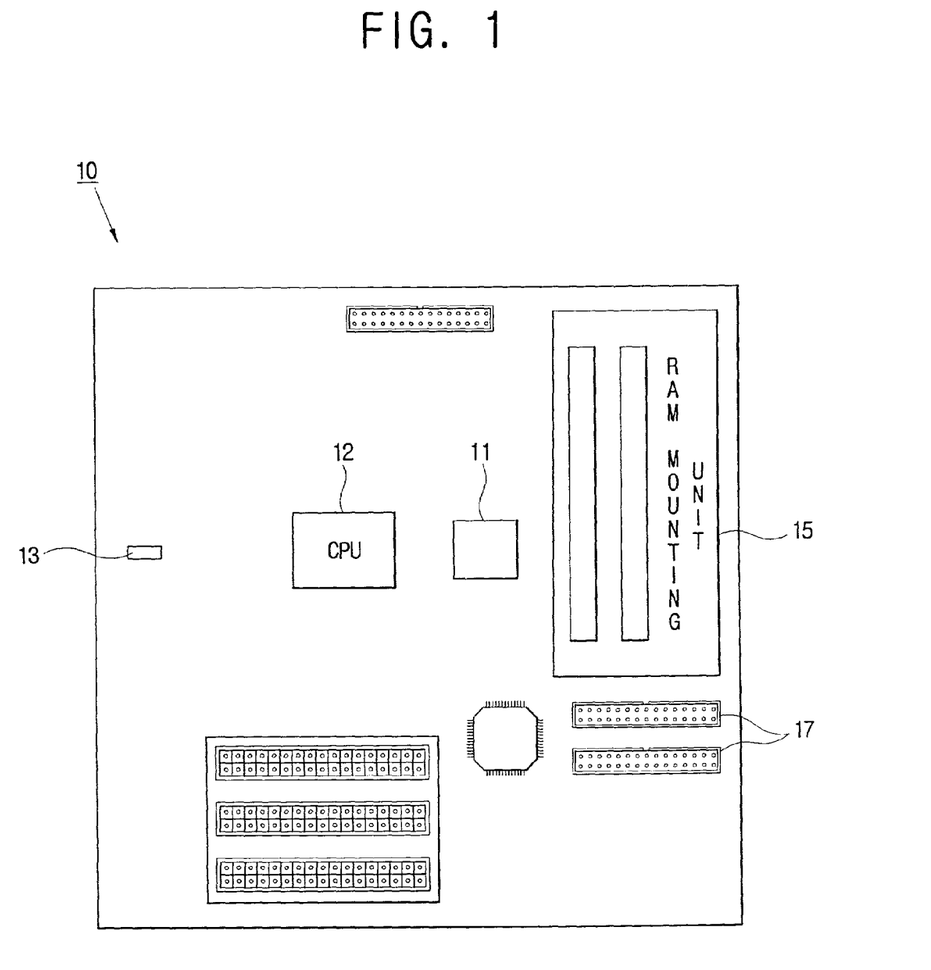
FIG. 1 is a plan view illustrating a main board according to a first embodiment of the present invention, in accordance with the principles of the present invention.
Figure 2:
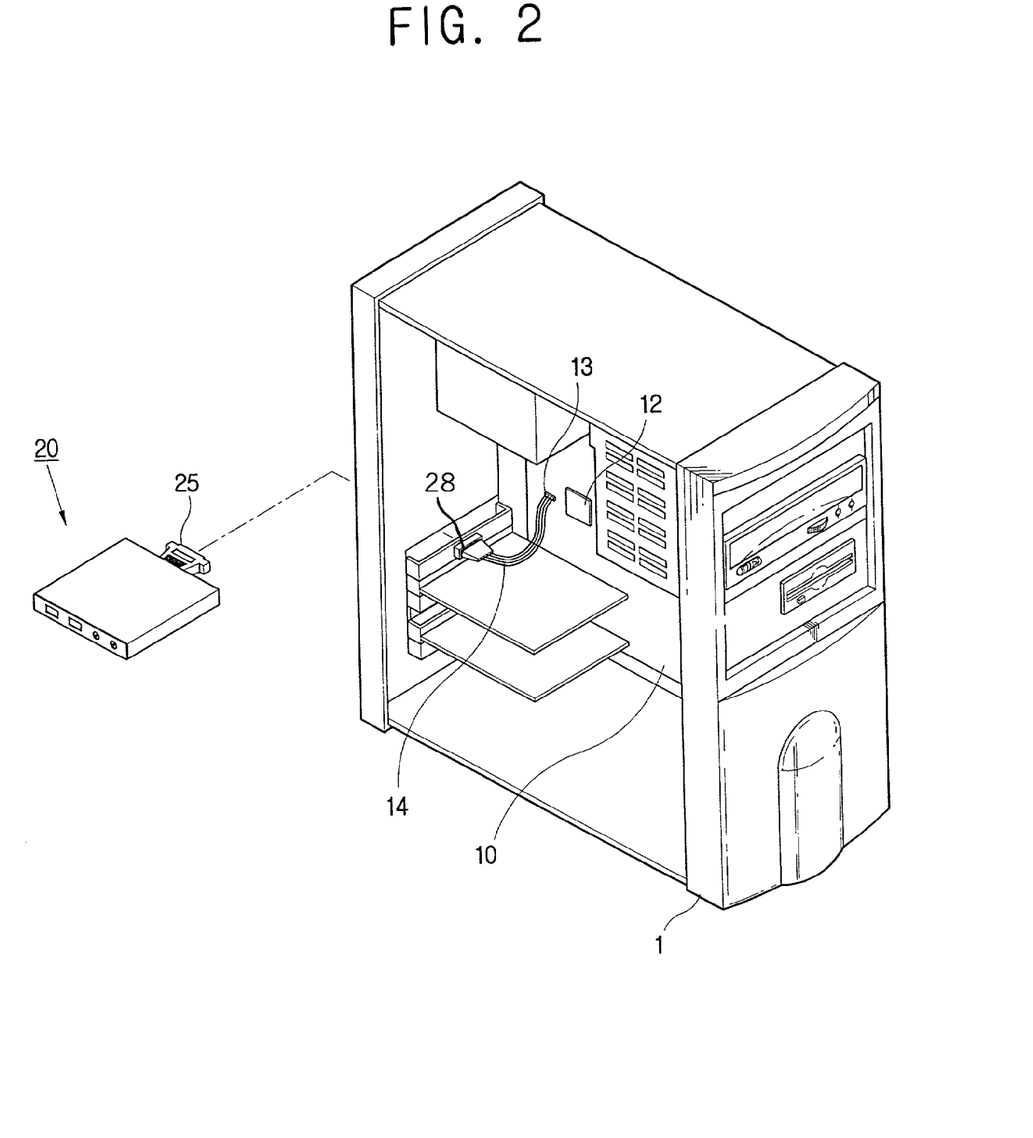
FIG. 2 is a perspective view illustrating a computer system using the main board according to the first embodiment of the present invention, in accordance with the principles of the present invention.
Figure 3:
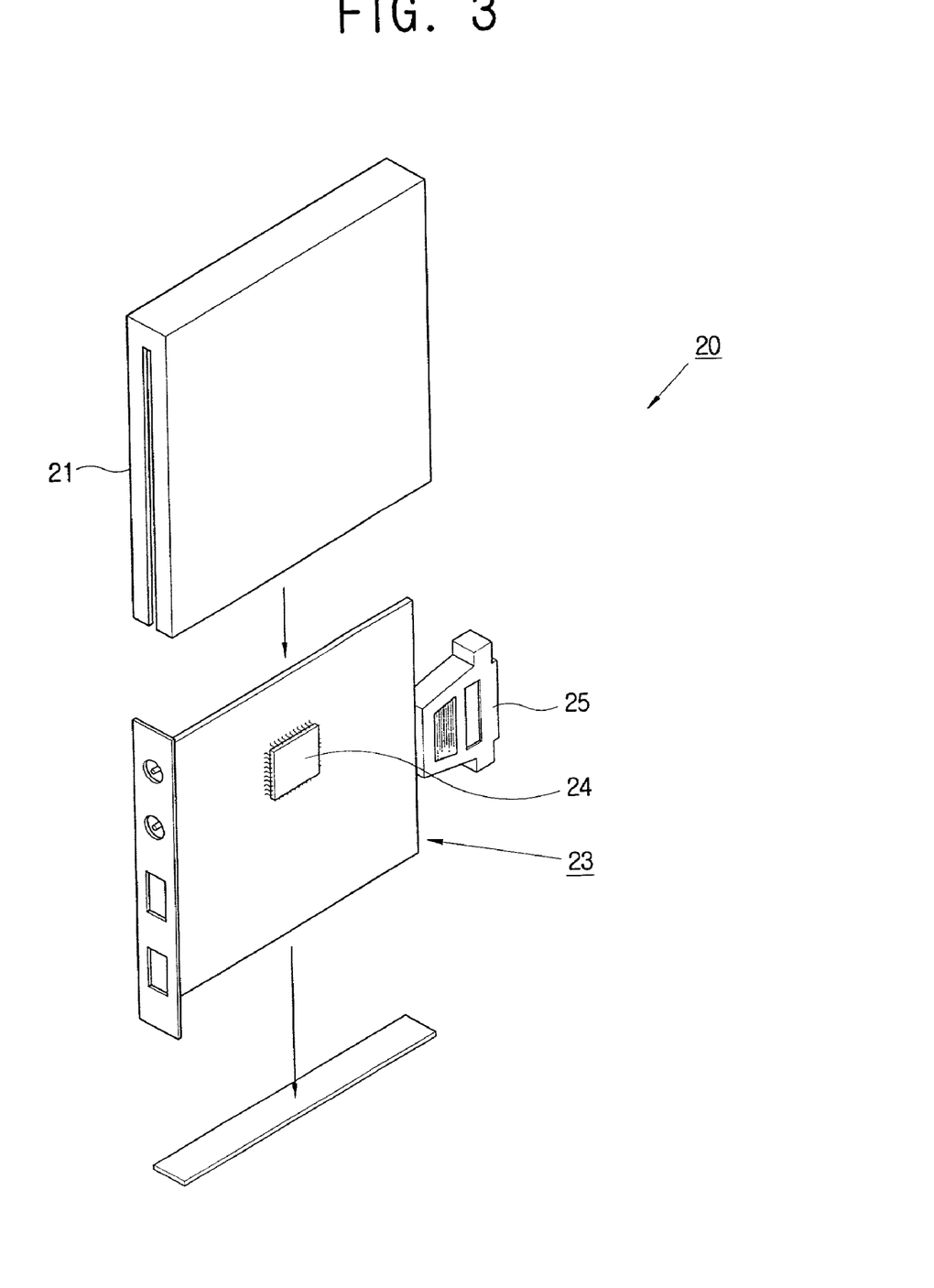
FIG. 3 is an exploded perspective view illustrating an AC97 card unit used in the computer system according to the first embodiment of the present invention, in accordance with the principles of the present invention.

Now, the present invention will be described in detail, with reference to the accompanying drawings. FIG. 1 is a plan view illustrating a main board according to a first embodiment of the present invention. FIG. 2 is a perspective view illustrating a computer system using the main board according to the first embodiment of the present invention. FIG. 3 is an exploded perspective view illustrating an AC97 card unit used in the computer system. Referring to these figures, the computer system includes a computer body 1 forming a casing for the computer system, a main board 10 mounted in the computer body 1 and configured to support the AC97 standard interface, and an AC97 card unit 20.

As shown in FIG. 1, the main board 10 includes a central processing unit (CPU) 12, a random access memory (RAM) mounting unit 15 adapted to mount a random access memory (not shown) thereto, connectors 17 respectively adapted to be connected with hardware units mounted in the computer body 1, and an AC97 controller 11 configured to support the AC97 standard interface.

The AC97 controller 11 may comprise an ICH chip or ICH2 chip by Intel Corporation, or a south bridge chip by VIA Corporation. The ICH chip by Intel Corporation is preferably used in accordance with the present invention.

The AC97 controller 11 performs a control function for allowing the CPU 12 to perform tasks performed by sound, modem, and LAN cards in certain cases. To this end, the AC97 controller 11 is configured to support the AC97 standard interface. By virtue of this AC97 controller 11, accordingly, an AC97 card may be used which dispenses with a separate controller for controlling audio, modem, and networking functions. That is, sound, modem and networking functions, which are performed by a controller provided in an optional card in certain cases, are controlled by the AC97 controller 11 provided in the main board 10. The AC97 controller 11 performs audio and communication functions in cooperation with the CPU 12, based on signals received from an AC97 card 23 (FIG. 3).

The AC97 card unit 20 (FIG. 2) includes a housing 21, an AC97 card 23 in the AC97 card unit 20 mounted in the housing 21 and configured to support the AC97 standard interface, and a connection jack 25 arranged outside the housing 21 and adapted to transmit a signal from the AC97 card 23 to the AC97 controller 11. The housing 21 can be referred to as a card enclosure 21.

The AC97 card 23 may comprise a n audio modem riser (AMR) card performing audio and modem functions, a communication and networking riser (CNR) card, or an advanced communication riser (ACR) card. The CNR and ACR cards additionally have a networking function along with the functions of the AMR card. The AC97 card 23 is mounted with an analog codec 24 for performing audio and communication functions, as shown in FIG. 3.

The AC97 card 23 outputs a basic clock associated with an operation thereof, that is, a bit clock signal, a serial data-in signal to be transmitted from the analog codec 24 to the AC97 controller 11, a serial data-out to be transmitted from the AC97 controller 11 to the analog codec 24, and an initialization signal for the AC97 controller 11, that is, an AC reset signal. The AMR, CNR, and ACR cards have the same feature in terms of signals outputted from the AC97 card 23 to be transmitted to the AC97 controller 11. In other words, the signals respectively outputted from the AMR, CNR, and ACR cards to be transmitted to the AC97 controller 11 are identical.

The output signals from the AC97 card 23 are transmitted through the connection jack 25 of the AC97 card unit 20, through the external connector 28, through the cable 14, and then through the AC97 connection port 13 to the AC97 controller 11. The external connector 28 is secured at an accessible location on or near an outer surface of the computer body 1, as shown in FIG. 2.

As shown in FIGS. 1 and 2, the AC97 connection port 13 is provided at a desired portion of the main board 10. In the case illustrated in FIGS. 1 and 2, the AC97 connection port 13 has a serial port structure. To this end, the connection jack 25 has a structure meeting the serial port structure of the AC97 connection port 13 so that it is connected with the AC97 connection port 13. An extension cable 14 is connected between the AC97 connection port 13 and the connection jack 25 of the AC97 card unit 20, as show in FIG. 2. The extension cable 14 serves to connect the AC97 connection port 13 and connection jack 25 to each other, thereby allowing output signals from the AC97 card unit 20 to be transmitted to the AC97 controller 11 of the main board 10.

In accordance with the above mentioned configuration, where the AC97 card unit 20, which may include any one of AMR, CNR, and ACR cards, is connected to the AC97 connection port 13 exposed at one side of the computer body 1, desired audio and communication functions can be performed in the computer system. That is, the AC97 controller 11 supporting audio and communication functions and the analog codec 24 of the AC97 card 23 included in the AC97 card unit 20 exchange signals with each other so that they are operatively connected to the CPU 12. Thus, desired audio and communication functions can be achieved in the computer system.

As apparent from the above description, where an AMR card is used as the AC97 card 23, it can be replaced by a CNR card or an ACR card without any replacement of the main board 10. Similarly, where a CNR card is used as the AC97 card 23, it can be replaced by an AMR card or an ACR card without any replacement of the main board 10. Also, where an ACR card is used, it can be replaced by an AMR card or a CNR card without any replacement of the main board 10.

Figure 4:
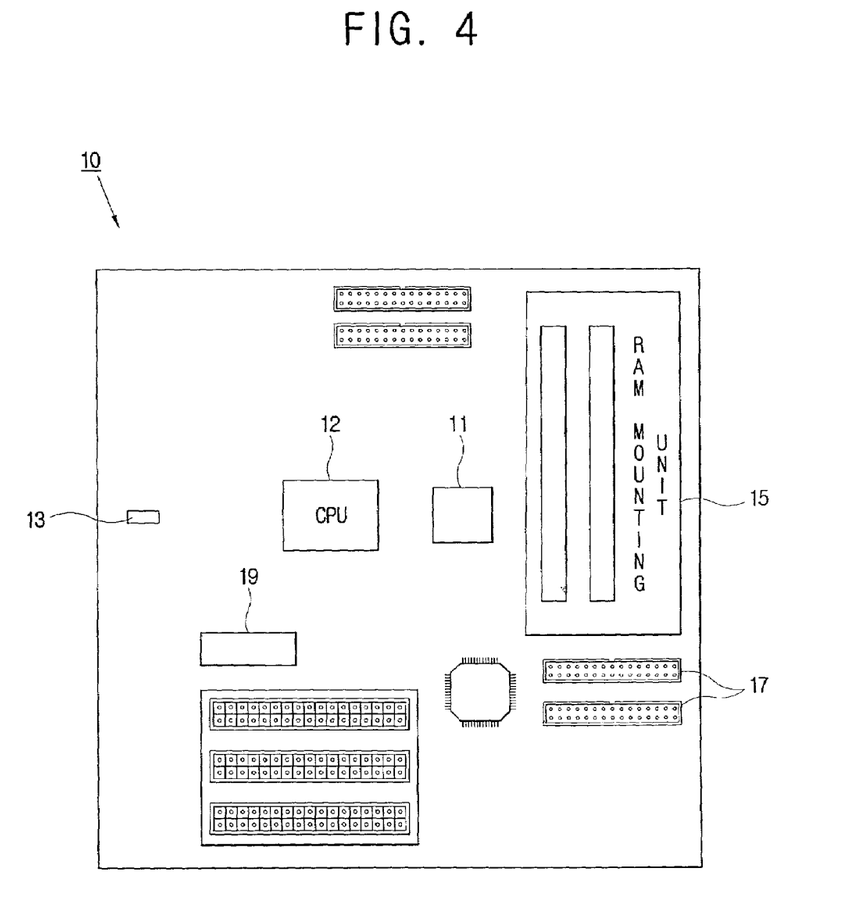
FIG. 4 is a plan view illustrating a main board according to a second embodiment of the present invention, in accordance with the principles of the present invention.

FIG. 4 is a plan view illustrating a main board according to a second embodiment of the present invention. The main board 10 according to the second embodiment has the same configuration as that of the first embodiment, except that it additionally includes an AC97 card slot 19 in order to directly mount the AC97 card 23 thereto. Thus, a computer system may be provided in which the AC97 card 23 may be directly mounted to the main board 10 via the AC97 card slot 19.

Although the AC97 connection port 13 connected to the connection jack 25 of the AC97 card unit 20 has a serial port structure in accordance with the above mentioned embodiments, it may have a PS/2 port structure (not shown), a parallel port, or a Universal Serial Bus (USB) port, a small computer systems interface (SCSI) port (not shown), an IEEE 1394 port (not shown), or other type of structure. In this case, of course, the object of the present invention can be accomplished.

The scope of the present invention includes the connection port 13 of FIG. 2 being coupled to a card unit 20 other than an AC97 card unit 20. In other words, the connection port 13 can be used with cards other than AC97 cards. Also, the card slot 19 of FIG. 4 can be used with cards other than AC97 cards. The port 13 and slot 19 are advantageous for any group of cards where the cards in the group may have different pin arrangements, different pin numbers, and different card shapes, while nevertheless having identical signals. That is, the signals all conform to a standard.

When the card unit 20 of FIGs. 2 and 3 is coupled to the main board 10, one side of the connection jack 25 will be connected to the card 23, and the other side of the connection jack 25 will be connected to connector 28.

The connection jack 25 may be configured to be a removable connection jack 25, which is removable from the card 23, or the connection jack 25 may be configured to be a permanent connection jack 25, which is permanently secured to the card 23. A removable connection jack 25 can be one of two types: a "one-fit" removable connection jack 25 or a "multi-fit" removable connection jack 25. A "one-fit" connection jack 25 is configured to mate with only one type of riser card, so that the connection jack 25 selected will vary in accordance with whichever riser card is being housed in the card unit 20. Alternatively, a "multi-fit" connection jack 25 is configured to mate with a plurality of different types of riser cards.

When the connection jack 25 is being used to mate with the connector 28, one side of the connection jack 25 will mate with card 23, and the other side of connection jack 25 will mate with the connector 28, regardless of whether the connection jack 25 is a removable connection jack 25 or a permanent connection jack 25.

The slot 19 of FIG. 4 can be configured to receive card 23 of FIG. 3 directly. Alternatively, the slot 19 can be configured to receive the connection jack 25 directly. When the connection jack 25 is being used to mate with the slot 19, one side of the connection jack 25 will mate with card 23, and the other side of connection jack 25 will mate with the slot 19, regardless of whether the connection jack 25 is a removable connection jack 25 or a permanent connection jack 25.

Also, although an AMR card, a CNR card, or an ACR card is used as the AC97 card mounted to the AC97 card unit 20 in the above mentioned embodiments, other types of AC97 cards may be used, which will be developed in the future to support the AC97 standard interface while outputting the same signals as those of the card used in the present invention. In this case, of course, the object of the present invention can be accomplished.

In the above mentioned embodiments, the extension cable 14 (FIG. 2) extending from the AC97 connection port 13 has been described as being directly connected to the AC97 card unit 20. However, a connection cable (not shown) may be connected between the extension cable 14 and the AC97 card unit 20 so as to electrically connect the extension cable 14 to the AC97 card unit. In this case, of course, the object of the present invention can be accomplished.

As apparent from the above description, the present invention provides a computer system which includes an AC97 card unit for internally mounting an AC97 card (ARM, CNR or ACR card) supporting the AC97 standard interface, and an AC97 connection port provided in a main board in such a fashion that it is externally connectable with the AC97 card unit, so that it can be compatible with different AC97 cards when one of those AC97 cards mounted on the main board is replaced by another one of the AC97 cards without any replacement of the main board.

While the present invention has been illustrated by the description of embodiments thereof, and while the embodiments have been described in considerable detail, it is not the intention of the inventor to restricts or in any way limit the scope of, the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the general inventive concept.

What is claimed is:

1. A computer apparatus, comprising:
 a computer body;
 a main board mounted in said computer body;
 a digital controller mounted on said main board, said digital controller being configured to support an audio standard interface;
 a card unit separate from said computer body, said card unit including a card for performing at least one of audio and communication functions, said functions supporting the audio standard interface;
 a connection jack fixed to said card unit and electrically connected to the card for transmitting a signal from the card to said digital controller; and
 a connection unit provided on said main board and electrically connected to said digital controller;
 wherein said computer body has an aperture formed therein for receiving said connection jack, said connection jack being mountable in said aperture so that said card and said card unit are mountable on an exterior of said computer body via said connection jack, said connection jack having an end extending through said aperture into an interior of said computer body;
 said apparatus further comprising a connection cable having a first end connected to the end of said connection jack extending through said aperture and having a second end connected to said connection unit;
 whereby said card unit and said card are electrically connected to said digital controller via said connection jack, said connection cable and said connection unit.

2. The apparatus of claim 1, said card unit further comprising a housing for removably receiving the card.

3. The apparatus of claim 1, wherein said connection unit comprises one of a serial port and a parallel port.

4. The apparatus of claim 1, the card being one of an audio and modem riser card, a communication and networking riser card, and an advanced communication riser card.

5. The apparatus of claim 1, wherein said extension cable extends from said first connection unit through said interior of said computer body to said connection jack.

6. A computer apparatus, comprising:
 a computer body;
 a main board mounted in an interior of said computer body;
 a first connection unit electrically connected to said main board;
 a digital controller mounted on said main board, said digital controller being electrically connected to said first connection unit via said main board, and said digital controller being configured to support a predetermined standard;
 a connection jack having a first connection side and a second connection side, said first connection side being electrically connected to a card selected from a plurality of cards, said second connection side being removably mountable in an opening in said computer body so that said second connection side extends through said opening into the interior of said computer body: and
 an extension cable having a first end electrically connected to said first connection unit, and having a second end electrically connected to said second connection side of said connection jack, said extension cable extending from said first connection unit through the interior of said computer body to said second connection side of said connection jack, said connection jack transmitting a signal from the selected card through said extension cable, said first connection unit and said main board to said digital controller, each card among said plurality of cards performing at least one respective function in accordance with the predetermined standard.

7. The apparatus of claim 6, said at least one respective function comprising at least one of audio functions and communications functions.

8. The apparatus of claim 6, said first connection unit comprising a connection port installed on and electrically connected to said main board, said first end of said extension cable being electrically connected to said connection port;

said second connection side of said connection jack comprising an external connector electrically connected to said second end of said extension cable and mounted on an exterior of said computer body, said second connection side of said connection jack mating with said external connector on the exterior of said computer body.

9. The apparatus of claim 8, further comprising a card enclosure for housing the selected card.

10. The apparatus of claim 6, further comprising a card enclosure for housing the selected card.

11. The apparatus of claim 6, the predetermined standard comprising an Audio-Codec '97 standard.

12. The apparatus of claim 11, said plurality of cards comprising at least two of an audio and modem riser card, a communication and networking riser card, and an advanced communication riser card.

13. The apparatus of claim 6, said plurality of cards comprising at least two of an audio and modem riser card, a communication and networking riser card, and an advanced communication riser card.

14. The apparatus of claim 6, said plurality of cards including a first group of cards having a first pin arrangement and a second group of cards having a second pin arrangement different from said first pin arrangement, said first connection side of said connection jack mating with any one card selected from said first group of cards, and not mating with any one card selected from said second group of cards.

15. The apparatus of claim 6, said first connection side of said connection jack being removably connected to the selected card.

16. The apparatus of claim 6, said plurality of cards including a first group of cards having a first pin arrangement and a second group of cards having a second pin arrangement different from said first pin arrangement, said first connection side of said connection jack mating with any one card selected from said first and second groups of cards.

17. The apparatus of claim 16, said first connection side of said connection jack being removably connected to the selected card.

18. The apparatus of claim 17, said first connection unit comprising a connection port installed on said main board said first end of said extension cable being coupled to said connection port, said second connection side of said connection jack comprising an external connector connected to said second end of said extension cable and mounted on an exterior of said computer body, said second connection side of said connection jack mating with said external connector on the exterior of said computer body.

19. The apparatus of claim 18, further comprising a card enclosure for housing the selected card.

20. The apparatus of claim 19, said at least one respective function comprising at least one of audio functions and communications functions.

21. The apparatus of claim 20, said plurality of cards comprising at least two of audio and modem riser cards, communication and networking riser cards, and advanced communication riser cards.

22. The apparatus of claim 21, the predetermined standard comprising an Audio-Codec '97 standard.

23. The apparatus of claim 22, said first connection unit, the selected card, and said card enclosure being grouped together to form a card unit, said card unit being removably electrically connected to said external connector and being located outside said computer body.

* * * * *